(12) United States Patent
Procter

(10) Patent No.: US 6,667,582 B1
(45) Date of Patent: Dec. 23, 2003

(54) LIGHT EMITTING DIODE REFLECTOR

(76) Inventor: Jeffrey K. Procter, 169 Bungower Road, Somerville, Victoria (AU), 3192

( * ) Notice: Subject to any disclaimer, the term of this patent is extended or adjusted under 35 U.S.C. 154(b) by 0 days.

(21) Appl. No.: 10/148,362

(22) PCT Filed: Nov. 24, 2000

(86) PCT No.: PCT/AU00/01432

§ 371 (c)(1), (2), (4) Date: May 24, 2002

(87) PCT Pub. No.: WO01/40703

PCT Pub. Date: Jun. 7, 2001

(30) Foreign Application Priority Data

Nov. 29, 1999 (AU) .............................. PQ 4313

(51) Int. Cl.[7] .............................. H05B 37/00; H01J 5/16
(52) U.S. Cl. .................................. 315/185 R; 313/113
(58) Field of Search ......................... 313/113

(56) References Cited

U.S. PATENT DOCUMENTS

| | | | |
|---|---|---|---|
| 5,136,483 A | * | 8/1992 | Schoniger et al. .......... 362/545 |
| 5,561,346 A | * | 10/1996 | Byrne ......................... 313/512 |
| 5,608,290 A | * | 3/1997 | Hutchisson et al. .... 315/200 A |
| 5,929,788 A | * | 7/1999 | Vukosic .................... 340/908.1 |
| 6,036,336 A | * | 3/2000 | Wu .............................. 362/249 |
| 6,053,621 A | * | 4/2000 | Yoneda ....................... 362/245 |

FOREIGN PATENT DOCUMENTS

| | | |
|---|---|---|
| DE | 29915504 U | 2/2000 |
| DE | 20000069 U | 5/2000 |
| JP | 10-003801 A | 1/1998 |
| JP | 11-213729 A | 8/1999 |
| WO | WO-99/42759 | 8/1999 |
| WO | WO-99/53238 A | 10/1999 |

* cited by examiner

*Primary Examiner*—Don Wong
*Assistant Examiner*—Minh D A
(74) *Attorney, Agent, or Firm*—Bartony & Hare, LLP

(57) ABSTRACT

A reflector for an LED (7) having a housing (1) and front portion (10) for emitting a main beam of light, the reflector comprising a body (6) defining a cavity in which the LED (7) maybe at least partially located, the body (6) comprising: (a) at least one wall (6, 10) to substantially surround the perimeter of the housing (1), said wall (6, 10) being spaced from the housing (1); (b) a fastener (9) to releasably fasten the LED (7) at least partially in the cavity; and (c) an opening (5) to permit passage of light from the LED (7); wherein the at least one wall (10) of the body is adapted to reflect a substantial amount of incident light from the LED towards the opening (5).

22 Claims, 2 Drawing Sheets

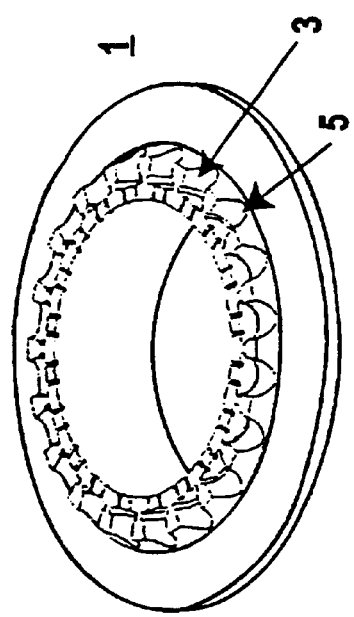
Figure 1
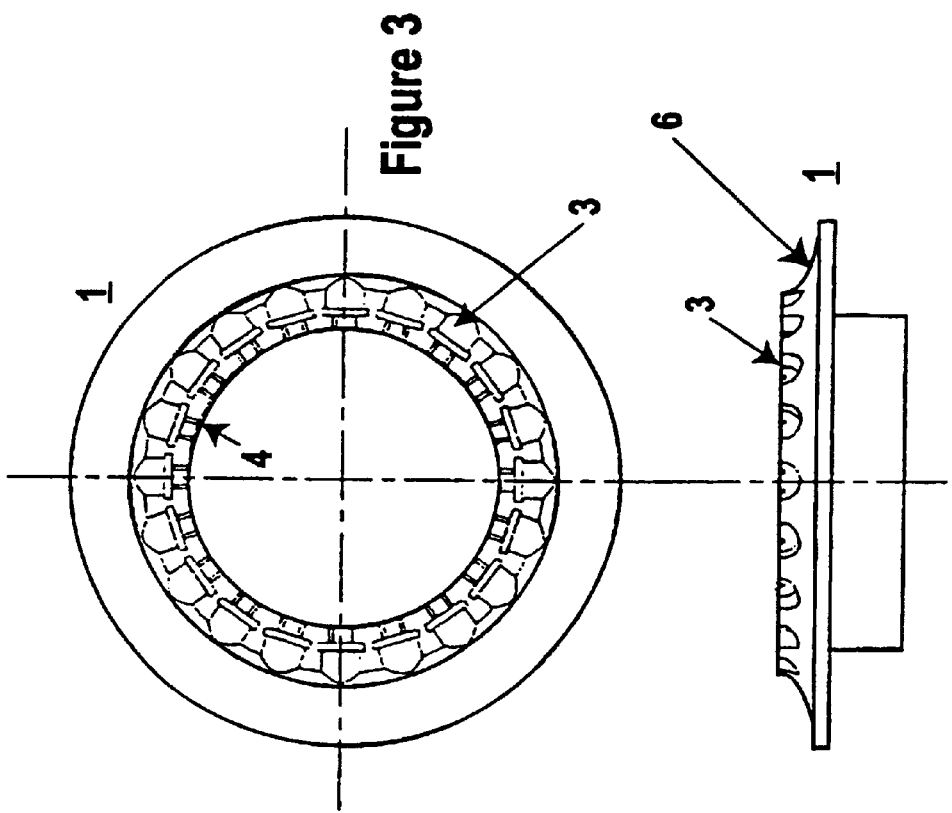
Figure 3
Figure 2

LIGHT EMITTING DIODE REFLECTOR

FIELD OF THE INVENTION

The invention relates to a reflector for a light emitting diode ("LED"). More particularly, the invention relates to a LED reflector which may be used with an LED array for specific purpose lights, eg navigational lights.

BACKGROUND OF THE INVENTION

The use of LEDs for light displays is well known. Typically, a LED has a low power consumption and high longevity. However, another characteristic of a LED is its low candescence compared to conventional lights and wide angle of light diffusion. This makes LEDs unsuitable without modification for certain application. Consequently, where the particular application of an array of LEDs requires the light beam to be concentrated in a particular direction or plane, reflector devices have been used. These applications are typically in the navigational area where concentrated light beams are desirable for beacons.

One approach is disclosed in U.S. Pat. No. 5,130,761 (Tanaka). The reference to this document is by way of illustration of one particular approach to the problem and is not to be construed as an admission that the document is common general knowledge in Australia or was known to persons in Australia at the priority date.

Tanaka discloses an LED array with a reflector. That invention is said to be an LED array having a printed circuit board, a plurality of LED chips disposed linearly on the printed circuit board, each LED chip being capable of radiating a light beam, and a reflection member for reflecting the light beam from the LED chip and to guide the light beam outward of the LED array in the main illumination direction generally parallel to the surface of the board. Consequently, the Tanaka invention is directed to linear arrays of LEDs and reflection of the LED light beam in a direction perpendicular to the LED (ie parallel to the surface of the circuit board upon which the LED chip is mounted).

Tanaka also discloses other arrangements to redirect and/or concentrate the light beam from a linear LED array.

None of the devices disclosed in Tanaka reflect those portions of the LED light beam which travel in a direction between adjacent LEDs in the array. As such, a significant amount of light is not concentrated.

SUMMARY OF THE INVENTION

According to one preferred form of the invention there is provided, a reflector for a LED having a housing and a front portion for emitting a main beam of light, the reflector comprising a body defining a cavity in which the LED may be at least partially located, the body comprising:

(a) at least one wall to substantially surround the perimeter of the housing, said wall being in use spaced from the housing;

(b) a fastener to releasably fasten the LED at least partially in the cavity; and (c) an opening to permit passage of light from the LED; wherein the at least one wall of the body is adapted to reflect a substantial amount of incident light from the LED towards the opening.

A reflector according to the present invention is most suitably for a circular array of LEDs each having a housing and a front portion for emitting a main beam of light, the reflector comprising a body having an axis, said body defining a plurality of cavities extending radially from the axis in which the LEDs may be at least partially located, the cavities comprising:

(a) at least one wall to substantially surround the perimeter of the housing, said wall being spaced from the housing and adapted to reflect incident light from the LED along the cavity towards an open end of that cavity; and (b) a fastener to releasably fasten the LED at least partially in the cavity.

The reflector wall which substantially surrounds the perimeter of the housing substantially increases the amount of light emerging from the opening of the reflector.

According to a particularly preferred embodiment, the space between the at least one wall and the housing defines a gap through which light passes towards the open end of the cavity. Such a gap increases the amount of light which is reflected towards the opening by enabling the reflector to have shape or surface features which are separate from the LED housing and which direct the light to the open end of the cavity. According to another embodiment, the space may be filled with a transparent medium through which light passes towards the open end of the cavity. The transparent medium according to this preferred embodiment may be any suitable medium. Preferably it may form a seal to stop water from entering the cavity. Preferably, the LED is fastenable substantially within the cavity so as to maximise the amount of light which is reflected. Where the LED is fastened substantially within the cavity, then preferably it is fastenable at one end of the cavity and preferably at the opposite end to the opening. This allows for greater reflection of light through the opening by providing a greater area of wall to reflect the light.

According to another preferred embodiment, the depth of the cavity approximates the depth of the LED so the upper extremity of the LED does not extend significantly from the body. In this way, any divergent light emitting from the upper region of the LED which is incident on the wall will be reflected towards the opening.

Preferably, the at least one wall may be extended from the body to define a pair of divergent surfaces. These divergent surfaces permit the light emitting from the cavity to extend substantially along one plane but reflects any incident light upon those surfaces in the same direction. This means the light may radiate in substantially one plane but not substantially in another plane. This is particularly desirable in navigational lights for example in the marine environment, where light travelling upward from a beacon is of little use to mariners who are in approximately the same plane as the beacon.

The direction of reflection of the light may be determined by any suitable mechanism. According to one preferred embodiment, the direction of reflection of the light is determined at least in part by the shape of the wall. According to a particularly preferred embodiment, the shape of the wall substantially determines the direction in which the light is reflected. Preferably the wall is substantially concave in shape and preferably it is axially symmetrical. The direction of reflection may also be determined at least in part by features of the surface of the wall.

According to another preferred embodiment, the features of the surface of the wall substantially determine the direction of reflection of the light. In a particularly preferred embodiment, the wall comprises ridges which increase the amount of light reflected towards the open end of the cavity of the reflector.

Conveniently, the cavity may be formed by the body being at least two parts which are connectable together. This permits easier replacement and location of the LED in the cavity, especially when the depth of the cavity is similar to the depth of the LED so the upper extremity of the LED does not extend from the cavity.

In such a case, the body preferably comprises complimentary parts which are connectable together. Preferably the complimentary parts are identical so as to minimize the costs of production. The complimentary parts preferably have portions of the cavity formed therein so that upon their connection together the cavity is formed. Preferably, the fastener of the LED would also be formed with such connection. For example, the slots for the mounting pins of an LED may be formed when two parts are connected.

According to a particularly preferred embodiment, a plurality of reflectors according to the present invention are arranged in an array so as to maximize the amount of light emitted. Preferably the reflectors are arranged in a circular array, and preferably each reflector is arranged so as to have its opening radially positioned in an outward direction. This arrangement is used when the array is used for 360° light applications such as with beacons. Of course, there is no reason why a linear array for other applications could not be adopted.

The circular arrays may be integrated into a single rather than an individual bodies. In such a case, the body preferably comprises complimentary parts which are connectable together. Preferably the complimentary parts are identical so as to minimize the costs of production. The complimentary parts preferably have portions of the cavity formed therein so that upon their connection together the cavity is formed. Preferably, the fastener of the LED would also be formed with such connection. For example, the slots for the mounting pins of an LED may be formed when two parts are connected.

According to another embodiment of the present invention, it is in the form of a light which comprises a plurality of reflectors according to the present invention and a plurality of LEDs located therein.

A still further embodiment comprises a reflector for a circular array of LEDs each having a housing and a front portion for emitting a main beam of light, the reflector comprising a body having an axis, said body defining a plurality cavities extending radially from the axis in which the LEDs may be at least partially located, comprising:

(a) at least one wall to substantially surround the perimeter of the housing, said wall being spaced from the housing and adapted to reflect incident light from the LED along the cavity towards an open end of that cavity; and (b) a fastener to releasably fasten the LED at least partially in the cavity wherein the body comprises at least two complimentary circular parts which are connectable together.

The circular parts of the reflector may take any suitable form, they may by discs, they may be rings and preferably they are identical. According to another embodiment there is provided a light comprising a plurality of reflectors as set out immediately above.

According to another preferred embodiment, there is provided a light comprising a reflector for a circular array of LEDs each having a housing and a front portion for emitting a main beam of light, the reflector comprising a body defining a plurality of radially extending cavities in which the LEDs may be at least partially located, comprising:

(a) at least one wall to substantially surround the perimeter of the housing, said wall being spaced from the housing and adapted to reflect incident light from the LED along the cavity towards an open end of that cavity; and (b) a fastener to releasably fasten the LED at least partially in the cavity wherein the body comprises at least two complimentary circular parts which are connectable together.

As with the previously described embodiment, the circular parts of the reflector may take any suitable form, they may by discs, they may be rings and preferably they are identical.

BRIEF DESCRIPTION OF THE DRAWINGS

The invention will now be further explained and illustrated by reference to the accompanying drawings in which:

FIG. 1 is a perspective view of one half of an LED reflector array according to one form of the invention;

FIG. 2 is a front view of the half LED reflector array of FIG. 1;

FIG. 3 is a plan view of the half LED reflector array of FIG. 1; and

DESCRIPTION OF PREFERRED EMBODIMENT

Figure 4:
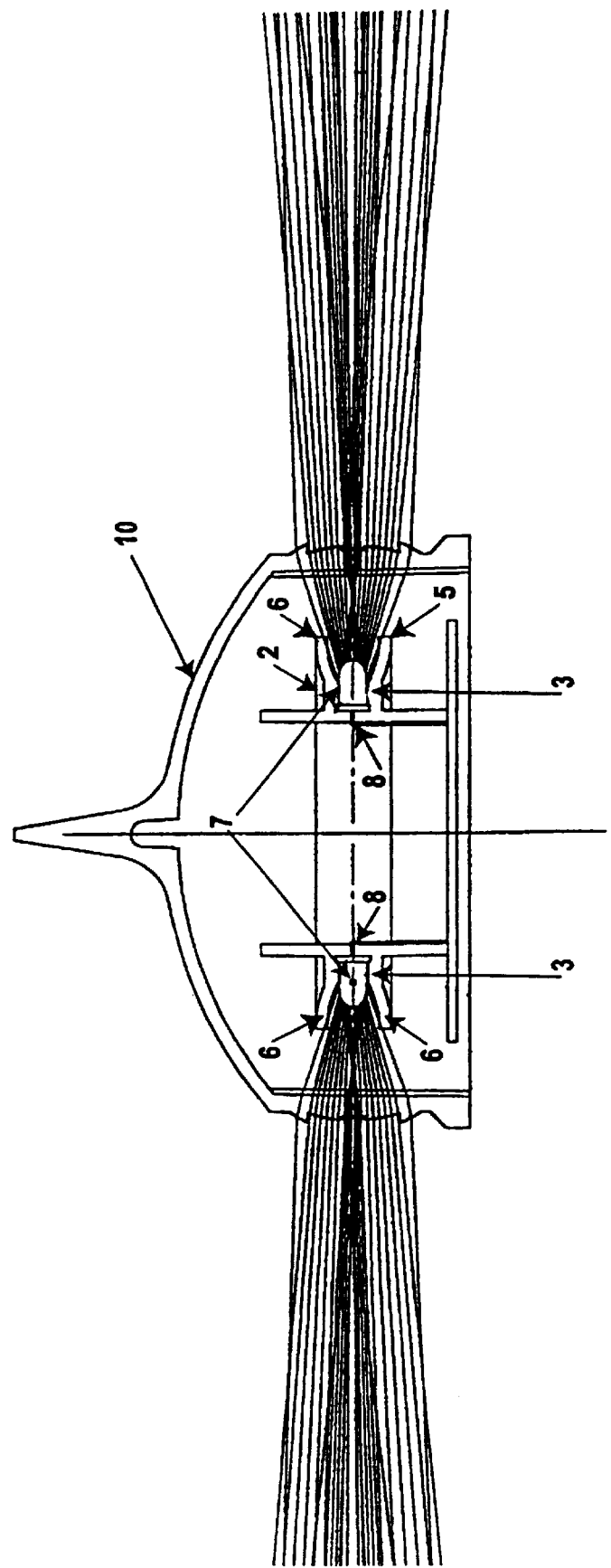
FIG. 4 is a cross-sectional view of a beacon utilising the LED reflector of FIG. 1.

FIGS. 1 to 3 illustrate a basic half component 1 of the reflector array 2 of the invention. Two of these components 1 are connected to each other to form reflector array 2 as seen in FIG. 4.

Each component 1 has a circular array of half bodies defining half cavities 3. Each half body 3 is designed to surround half of the perimeter of the housing in a plane perpendicular to the direction of the main beam each LED (not shown). The wall defining such cavities reflects any incident light towards the opening 5.

Each cavity 3 has two half passageways 4 extending towards the centre of component 1. These are designed so that when reflector array 2 is formed, the respective half passageways 4 align to form the passageways into which the LED terminals are located and mounted.

Each component 1 also has a diverging surface 6 extending from the opening 5. As more clearly shown in FIG. 4, these surfaces 6 will provide additional reflection surfaces of diverging light emanating from the LED in one plane.

Referring to FIG. 4 specifically, the LED reflector array 2 defines cavities 3. A single LED 7 is mounted in each cavity 3 by pressing its terminals 8 into the passageways 4. Extending from the wall 5 of each body 3 is a pair of divergent surfaces 6. The LED array is mounted on a support 9 which may also support the circuit board (not shown). A lens 10 is placed over the LED array 2 to provide a predetermined diffusion/concentration of the light and also to protect the array 2 from the weather.

In use, when the LED array 2 is energised, light emits from cavities 3. That light is in turn further directed along a predetermined plane(s) by divergent surfaces 6. Very little light is lost in directions away from the direction of the main beam. As such it is possible to increase the candescence of the beacon.

The word 'comprising' and forms of the word 'comprising' as used in this description and claims do not limit the invention claimed to exclude any variants or additions.

Modifications and improvements to the invention will be readily apparent to those skilled in the art. Such modifications and improvements are intended to be within the scope of this invention.

The claims defining the invention are as follows:

1. A reflector for a circular array of LEDs each having a housing and a front portion for emitting a main beam of light, the reflector comprising a body having an axis said body defining a plurality of cavities extending radially from the axis in which the LEDs may be at least partially located, comprising:

(a) at least one wall to substantially surround the perimeter of the housing, said wall being spaced from the housing and adapted to reflect incident light from the LED along the cavity towards an open end of that cavity; and (b) a fastener to releasably fasten the LEDs at least partially in the cavity.

2. A reflector according to claim 1, wherein the space between the at least one wall and the housing defines a gap through which light passes towards the open end of that cavity.

3. A reflector according to claim 1, wherein the space between the at least one wall and the housing is filled with a transparent medium through which light passes towards the open end of that cavity.

4. A reflector according to claim 1 wherein the depth of the cavity approximates the depth of the LED.

5. A reflector according to claim 1 wherein the at least one wall extends from the body to define a pair of divergent surfaces.

6. A reflector according to claim 1, wherein the at least one wall is substantially concave in shape.

7. A reflector according to claim 1, wherein the at least one wall is axially symmetrical.

8. A reflector according to claim 1 wherein the at least one wall comprises ridges to increase the amount of light reflected towards the open end of that cavity.

9. A reflector according to claim 1 wherein the body comprises at least two parts which are connectable together.

10. A reflector according to claim 9 wherein the body comprises complimentary parts.

11. A reflector according to claim 9 wherein the body comprises identical parts.

12. A reflector according to claim 9 wherein the fastener is formed by connection of the complimentary parts.

13. A light comprising a plurality of reflectors according to claim 1 and a plurality of LEDs located therein.

14. A reflector for a circular array of LEDs, each having a housing and a front portion for emitting a main beam of light, the reflector comprising a body having an axis said body defining a plurality of cavities extending radially from the axis in which the LEDs may be at least partially located, comprising:

(a) at least one wall to substantially surround the perimeter of the housing, said wall being spaced from the housing and adapted to reflect incident light from the LED along the cavity towards an open end of that cavity; and (b) a fastener to releasably fasten the LED at least partially in the cavity wherein the body comprises at least two complimentary circular parts which are connectable together.

15. A reflector according to claim 14 wherein the circular parts are discs.

16. A reflector according to claim 14 wherein the circular parts are rings.

17. A reflector according to claim 14 wherein the circular parts are identical.

18. A light comprising a plurality of reflectors according to claim 14.

19. A light comprising a reflector for a circular array of LEDs each having a housing and a front portion for emitting a main beam of light, the reflector comprising a body having an axis, said body defining a plurality of cavities extending radially from the axis in which the LEDs may be at least partially located, comprising:

(a) at least one wall to substantially surround the perimeter of the housing, said wall being spaced from the housing and adapted to reflect incident light from the LED along the cavity towards an open end of that cavity; and (b) a fastener to releasably fasten the LED at least partially in the cavity wherein the body comprises at least two complimentary circular parts which are connectable together.

20. A light according to claim 19 wherein the circular parts are discs.

21. A light according to claim 19 wherein the circular parts are rings.

22. A light according to claim 19 wherein the circular parts are identical.

* * * * *